US012597442B2

(12) United States Patent
Adany

(10) Patent No.: US 12,597,442 B2
(45) Date of Patent: Apr. 7, 2026

(54) ESTIMATION AND CORRECTION OF ECCENTRIC PHONOGRAPH RECORD PLAYBACK IN DIGITAL AUDIO RECORDINGS

(71) Applicant: Peter Adany, Schaumburg, IL (US)

(72) Inventor: Peter Adany, Schaumburg, IL (US)

(73) Assignee: Peter Adany, Schaumburg, IL (US)

( * ) Notice: Subject to any disclaimer, the term of this patent is extended or adjusted under 35 U.S.C. 154(b) by 0 days.

(21) Appl. No.: 18/964,691

(22) Filed: Dec. 2, 2024

(65) Prior Publication Data

US 2026/0045277 A1    Feb. 12, 2026

Related U.S. Application Data

(60) Provisional application No. 63/614,628, filed on Dec. 25, 2023, provisional application No. 63/605,087, filed on Dec. 1, 2023.

(51) Int. Cl.
| | |
|---|---|
| *G11B 7/24* | (2013.01) |
| *G11B 3/00* | (2006.01) |
| *G11B 7/09* | (2006.01) |
| *G11B 11/10* | (2006.01) |
| *G11B 20/10* | (2006.01) |

(52) U.S. Cl.
CPC ........ *G11B 20/10472* (2013.01); *G11B 3/007* (2013.01); *G11B 3/008* (2013.01); *G11B 20/10453* (2013.01)

(58) Field of Classification Search
CPC ......... G11B 5/00; G11B 5/09; G11B 5/59627; G11B 20/1219; G11B 2020/1238; G11B 2020/1292; G11B 7/24021; G11B 7/24029; G11B 7/0956
USPC ...................................................... 369/53.14
See application file for complete search history.

(56) References Cited

U.S. PATENT DOCUMENTS 8,045,282 B2 * 10/2011 Vikramaditya ........ G11B 5/743
360/71

* cited by examiner

*Primary Examiner* — Nabil Z Hindi

(57) ABSTRACT

Computing systems and methods for estimation and correction of audio pitch variations resulting from eccentric rotation in the playback of phonograph records are disclosed. The methods include simulation of phonograph playback to generate eccentric and non-eccentric time bases for correction. Estimation of eccentricity parameters is done by a parameter optimization through evaluation of a spectral sharpness detection function on time-spectral content of audio data. Candidate audio data are generated using phonograph simulation while conducting an optimal parameter search. The disclosed technology further provides systems and methods to correct audio using such parameters to correct the induced pitch variations from eccentric phonograph record playback in order to improve the pitch stability of audio recordings. In addition, the physical properties of groove radius and playback speed variations in phonograph playback may be estimated from the eccentric record playback.

18 Claims, 13 Drawing Sheets

AUDIO DATA INPUT FILE 510

OPTIMAL PARAMETERS 560

PHONOGRAPH SIMULATOR ECCENTRICITY AUDIO PITCH CORRECTION 600

CORRECTED AUDIO OUTPUT FILE 630

AUDIO INPUT FILE 510

OPTIMAL PARAMETERS 560

TIME BASE FLUCTUATION DATA 610

PHONOGRAPH SIMULATOR ECCENTRICITY ENHANCED AUDIO PITCH CORRECTION 620

CORRECTED AUDIO OUTPUT FILE

SELECTED AUDIO PORTION 910

AUDIO TIME-SPECTRAL DENSITY IMAGE 920

EXTREMAL VALUE 960

DETECTION FUNCTION OUTPUT DISPLAY 950

TIME SERIES PARAMETERS DISPLAY 930

GEOMETRIC PARAMETERS DISPLAY 940

ESTIMATION AND CORRECTION OF ECCENTRIC PHONOGRAPH RECORD PLAYBACK IN DIGITAL AUDIO RECORDINGS

RELATED APPLICATIONS

This application claims the benefit of U.S. Provisional Application No. 63/605,087, filed Dec. 1, 2023, and U.S. Provisional Application No. 63/614,628, filed Dec. 25, 2023, both of which are incorporated by reference herein in their entireties.

FIELD OF INVENTION

The present disclosed technology relates to digital processing of audio data obtained from the mechanical sound reproduction of phonograph records or similar media.

Additionally, the methods relate to use of computed mathematical models of physical systems to estimate parameters and reconstruct data, specifically for audio.

BACKGROUND

The playback of phonograph records, hereafter called "records", involves rotating a record on a phonograph at a steady speed in order to reproduce audio recordings. The recorded audio can be reproduced correctly if the stylus is moved through the groove at a constant speed equal to the speed of the inscription process used in making of the master disc. The speed of playback, specifically the rate of stylus traversal along the groove, imparts an audio frequency scaling factor called, in common language, the "pitch". A phonograph, hereafter called "turntable", is a mechanical playback device that includes a rotating platter on which the record is placed, a spindle at the center of the platter which is accepted by the record centering hole, a tone arm or similar moving part allowing radial travel to the groove of the record, and a playback stylus, fixed to the tone arm end, which contacts the record groove. The turntable being a mechanical playback system, the motion of the groove at the stylus contact point is influenced by the tonearm length and mounting distance from the spindle, the record's center of rotation relative to the true central axis of the groove, and the platter rotation speed. The record is designed such that a centering hole provides the needed reference for the center of rotation. With perfect manufacture and ideal playback system, the stylus motion in playback would be identical to that of the record inscription, and the reciprocity would result in correct, stable audio pitch. (Strictly, we note that only linear-tracking turntables can exactly match the lathe inscribing process.) However, manufactured records are often pressed imperfectly, such that the centering hole may be enlarged or dislocated with respect to the groove center, resulting in the condition called eccentric (also known as "off-center") record playback. Such playback exhibits pitch variations due to the eccentric motion. Given the popularity of records and their digital audio archival, methods to detect, estimate and correct eccentric record playback in the digitized audio, with or without prior knowledge of the record or turntable dimensions, are desired.

Prior concepts and approaches to correct for eccentric records have included digital signal processing-based approaches as well as physical corrective devices. In digital signal processing, a mainstay has been time-spectral decomposition of audio content, including applications to correct wow and flutter, among others [1-3]. A challenge of such methods is to identify a signature of the wow and flutter in otherwise heterogeneous audio content. Such methods for off-center record correction sought to identify significant spectral peaks in time-spectral power density of the audio data, or they assumed the presence of inaudible or accidental sources of pilot signals of a determinate nature. Mechanical approaches have considered modified turntable designs allowing repositioning or removal of the spindle, enlargement of the record centering hole to allow manual repositioning, as well as the electronic measurement of tonearm pivot angle, as with a potentiometer, or record groove position, as with optical sensors. In contrast with the aforementioned approaches, the present disclosed technology utilizes phonograph model simulation-based methods to detect and estimate the record playback eccentricity.

BRIEF DESCRIPTION OF THE DRA WINGS

DETAILED DESCRIPTION

Overview

The present disclosure describes methods to detect and estimate the parameters of eccentric record playback from digital audio data using computer readable-instructions, hereafter called "software," executable by a hardware processor, hereafter called, "computer." Further, the present disclosure describes methods to produce pitch-corrected digital audio using parameters of eccentric record playback by software executable by a computer. The disclosed technology involves the estimation of parameters that influence the record audio playback pitch including, but not limited to: a record centering hole offset position "vector" that is characterized by a distance and an angle; a record groove radius; a turntable tonearm length and tonearm mounting distance; and, a turntable drive speed. The purpose of the disclosed technology is to achieve the correction of pitch variations associated with eccentric record playback in order to improve the pitch stability of the audio. In addition, the disclosed technology allows for compensation of time-dependent playback speed fluctuations, i.e., from imperfect turntable speed controllers, which may impart rotation angle variations throughout the audio time course. The disclosed technology is thus directed towards restoring pitch stability of digital audio from phonograph playback, although other potential applications may exist.

Eccentric Phonograph Simulator

An eccentric record playback problem, methods and theory for correction are now described. A geometric system for a record with eccentric playback on a turntable platter is shown, not to scale, in FIG. 1 (a large eccentricity is shown for visual clarity). The turntable platter 100 rotates about a spindle center axis, P 110. The turntable tonearm is mounted at a distance from the spindle axis at the mounting point, M 120. (A linear tracking geometry may also be considered, for example by setting an arbitrarily large mounting distance or by simplifying the geometry model to omit the pivoting tonearm member.) The stylus contacts the record groove 140 at the point, S 130 with a groove radius 160. The aspects of the turntable that are treated as "parameters" include: the mounting distance, PM, the tonearm length, MS, and the time-dependent angle of rotation, p, 170 imparted by the turntable motor drive. Additionally, the aspects of the record that are treated as "parameters" include: the eccentricity offset distance, the eccentricity offset angle, and the groove radius at the moment of playback. It is noted that the groove is a spiral and not a circle, however, to an effective approximation it is described as having a "radius" that is the distance between the true center of rotation and the groove at the stylus position. It is also noted that the digital audio from the phonograph playback has additional properties that need to be specified, such as the sampling rate, encoding scheme and others.

Phonograph Modeling Simulator

Figure 1:
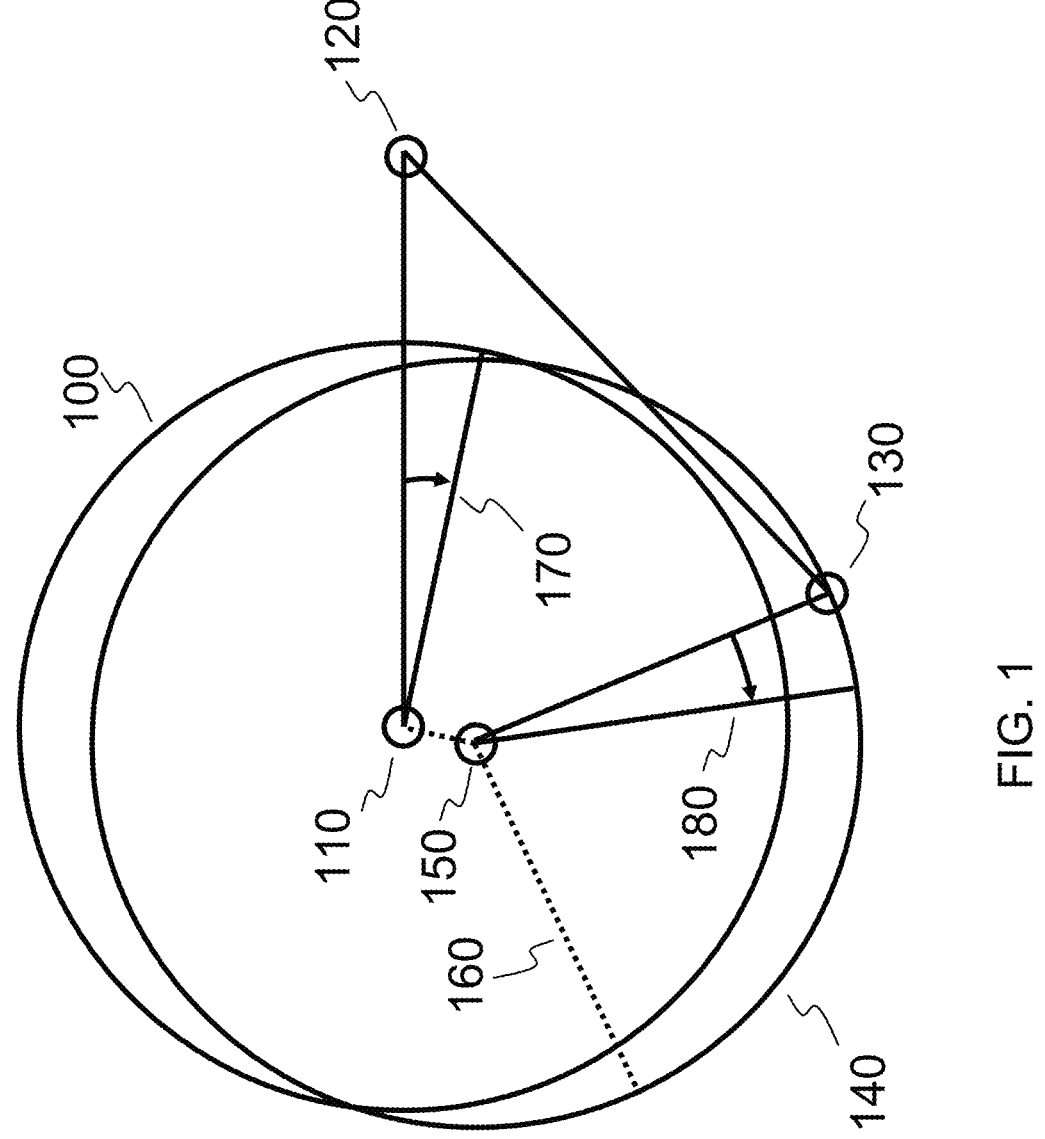
FIG. 1 is a schematic diagram of the geometry of off-center phonograph playback according to an example embodiment.

A geometry for playback eccentricity is depicted in FIG. 1, showing a mechanical center of rotation 110 that is displaced from the true center of rotation of the groove 150. In the presence of non-zero eccentricity, a moment of rotation 170 of the turntable platter imparts a complex motion of the stylus and the record at the point 130, and there is a resulting moment of rotation illustrated by 180 (shown exaggerated for clarity). In the absence of eccentricity, 170 becomes equivalent (up to an additional constant) to 180. Although it is a complicated geometric relationship, it will be evident to those skilled in the art that the rotation moment 180 is a one-to-one function of the platter rotation 170, and this relationship can be derived through analysis of the trigonometric relations. This model, characterizing the interactions of the turntable and record as one mechanical system, is incorporated into a phonograph simulator processing core, called the "phonograph simulator." The phonograph simulator operates by reproducing ideal, as well as eccentric, rotation angles referenced to the digital audio sampling time. Firstly, it is presumed that audio data are sampled at uniform time intervals, the time interval being defined as the inverse of the audio sampling rate. To every audio sample time point, $t_i$, a driven angle, $p(t_i)$, of the turntable is assigned. Such assignment incorporates turntable playback characteristics such as drive speed and starting angle. Absent other information, a starting angle of zero may be assigned. The unit of driven angles is proportional to the unit of audio sampling times by a constant factor, K, in units such as radians/second. For every driven angle, $p(t_i)$, the rotation, $r(t_i)$, illustrated by 180 is evaluated. The $r(t_i)$ can be converted to audio sampling time units by multiplying each value by $K^{-1}$. Hence, $r(t_i)$, converted to units of seconds, may be understood to provide a time base for the audio, derived by phonograph simulation. The disclosed technology proceeds by evaluating reference (zero-offset) and eccentric (non-zero offset) time bases in order to modulate the audio pitch as shown by module of FIG. 2A.

Audio Pitch Modification

Figure 2A:
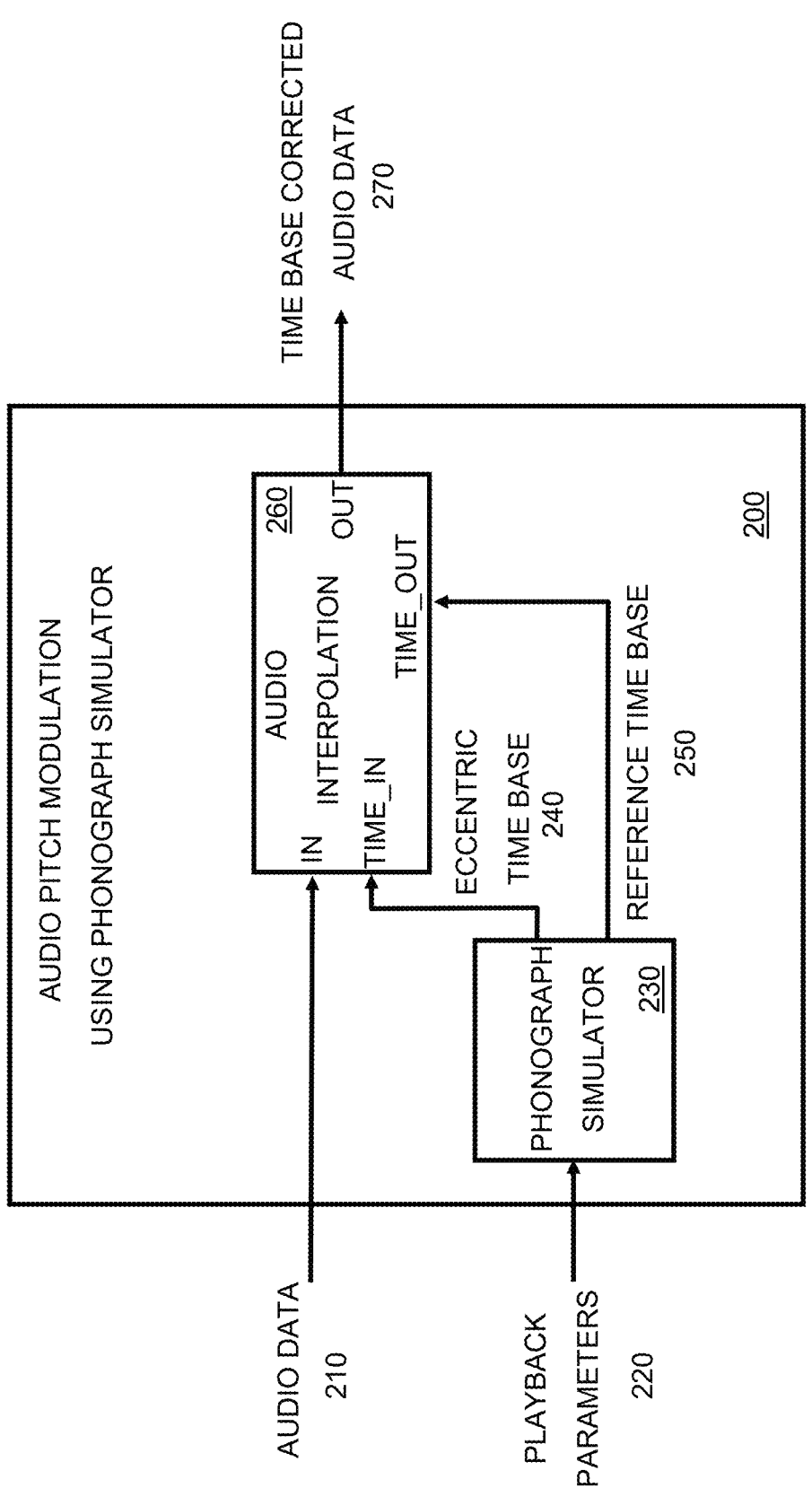
FIG. 2A is a block diagram illustrating a module for audio pitch modulation, according to an example embodiment.
Figures 6A, 6B:
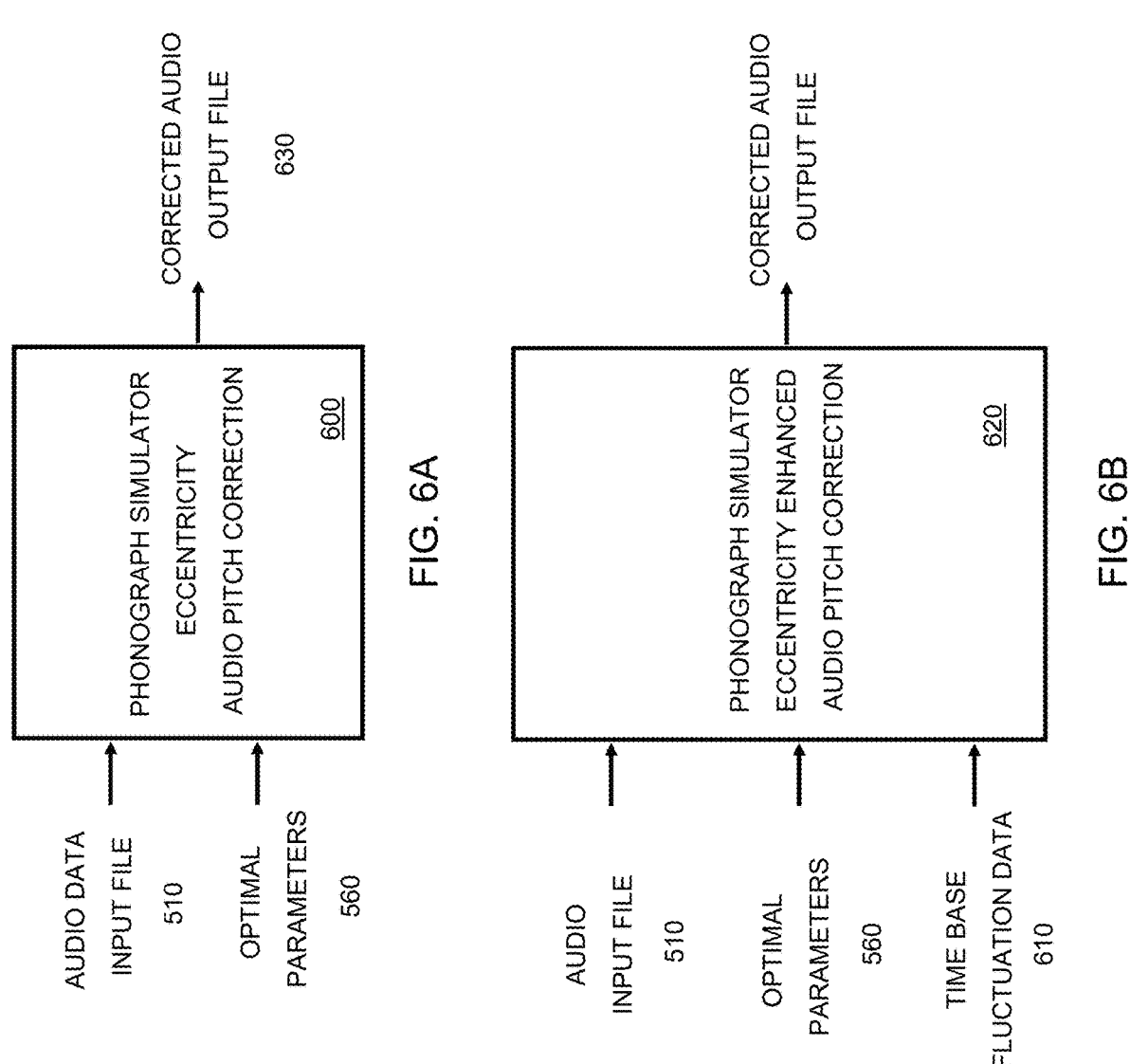
FIGS. 6A and 6B are block diagrams illustrating processing modules for digital audio processing-based pitch correction.

The phonograph simulator generates reference and derived time bases according to its input parameters, and interpolation is used to modify the time base of output audio relative to the input audio. For purposes of the interpolation (FIG. 2A), the conversion of angles (radians) into units of sampling time (seconds) is not strictly necessary; the time bases may be provided in units of radians with equivalent results. This eliminates a scaling step and potentially reduces floating point error. It will be familiar to those skilled in the art that an interpolation as described, wherein the input and output base values bear a smoothly varying relationship, can be understood as a "modulation" of the interpolated audio, resulting in the time-varying modification of audio pitch. Comparable known uses of such interpolation include wow and flutter corrections, and simulation of phonograph or tape manipulations (scrubbing, scratching, etc.), among others. In the present disclosure, the phonograph simulator (FIG. 2A, 230) is used in audio pitch modification ("modulation") for the parameter estimation process (FIG. 4A) as shown in FIG. 2A, and in creating the output audio waveform as shown in FIGS. 6A, and 6B. Additionally, the phonograph simulator is used to produce time-spectral patterns of pitch variations as in FIG. 4B for an accelerated estimation process.

A process for audio pitch modification (FIG. 2A, 200), using the phonograph simulator, is illustrated in FIG. 2A. The process receives audio data 210 and parameters of phonograph playback 220. The phonograph simulator 230 generates two time bases for audio interpolation. The first is a modified time base 240, which models eccentric playback parameters "under test". The second is a reference time base 250 that omits the eccentric offset but includes all other phonograph playback parameters. An audio interpolation process 260 interpolates from the input, a modified time base, to the output, a reference time base, so as to produce output audio data 270. A principal idea is that, if the eccentricity parameters "under test" are the correct parameters (i.e. if they match the true eccentricity), then the interpolation effectively counteracts and corrects the audio pitch by interpolating the input audio from the eccentric time base to the non-eccentric time base, and this results in a steady pitch of the output audio.

It is further noted that the reference time base may not require the use of a complete simulation of the phonograph, because for short enough audio segments it could be simplified to a uniform spacing of time points. However, the turntable geometry generally induces additional variations of the playback angle over the course of the audio, and therefore the reference time base is generally obtained using the phonograph simulator.

Eccentric Playback Parameter Estimation

Figure 3A:
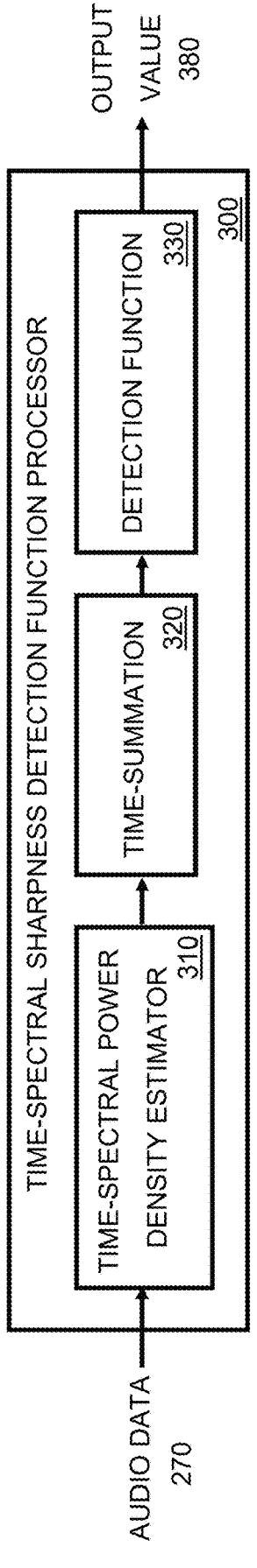
FIG. 3A is a block diagram illustrating a module for evaluating an audio power-spectral based detection function, according to an example embodiment.

A processing module for a time-spectral detection process is shown in FIG. 3A. Firstly, audio data (e.g., the interpolated audio 270) are processed to obtain the audio power time-spectral density (FIG. 3A, 310). It will be familiar to those skilled in the art that an audio power time-spectral density can be straightforwardly obtained using well known digital spectrum analysis techniques such as the windowed discrete Fast Fourier Transform. Let the time-spectral density $S(F_m, T_n)$ be a real-valued discrete function of two variables, having M frequency points, $F_m$, and N time points, $T_n$, for a total of M×N points. The frequencies, $F_m$, indexed by m=1 . . . . M, and the time points, $T_n$, indexed by n=1 . . . . N, may be uniformly or non-uniformly spaced; intensities may be linear or logarithmically scaled. The detection process proceeds by a summing operation 320 of the time-spectral data to obtain time-summed intermediate data, $Y(F_m)$. The time-summed data, $Y(F_m)$, is a sum of the time-spectral data over the time points, yielding M values:

$$y(Fm) = \sum_{n=1}^{N} (S(Fm, Tn)) \tag{1}$$

The estimation proceeds by application of a "detection function" 330 to the intermediate summed data. The detection function output 390 is a single real value expressed as 380:

$$D = \sum_{m=1}^{M-1} (|diff(y(Fm))|) \tag{2}$$

where ‖ refers to the absolute value and diff( ) refers to pair-wise finite differences of consecutive elements. The same equation (2) is expressed with an alternate formatting in FIG. 3B, 380 as D=SUM(ABS(DIFF(Y))). The diff( ) finite difference operation yields M−1 points, hence summation is conducted over m=1 . . . . M−1. The output distribution of this detection function is such that incorrect input parameters tend to result in output values within a narrow range, e.g. near zero or a "plateau," whereas the output exhibits a prominent extremal value when the parameters under test exactly, or nearly, match the true eccentricity parameters. Therefore, seeking the extremum of the output is an "optimization" that provides a sensitive method to identify the true eccentricity parameters, if present.

Figure 3B:
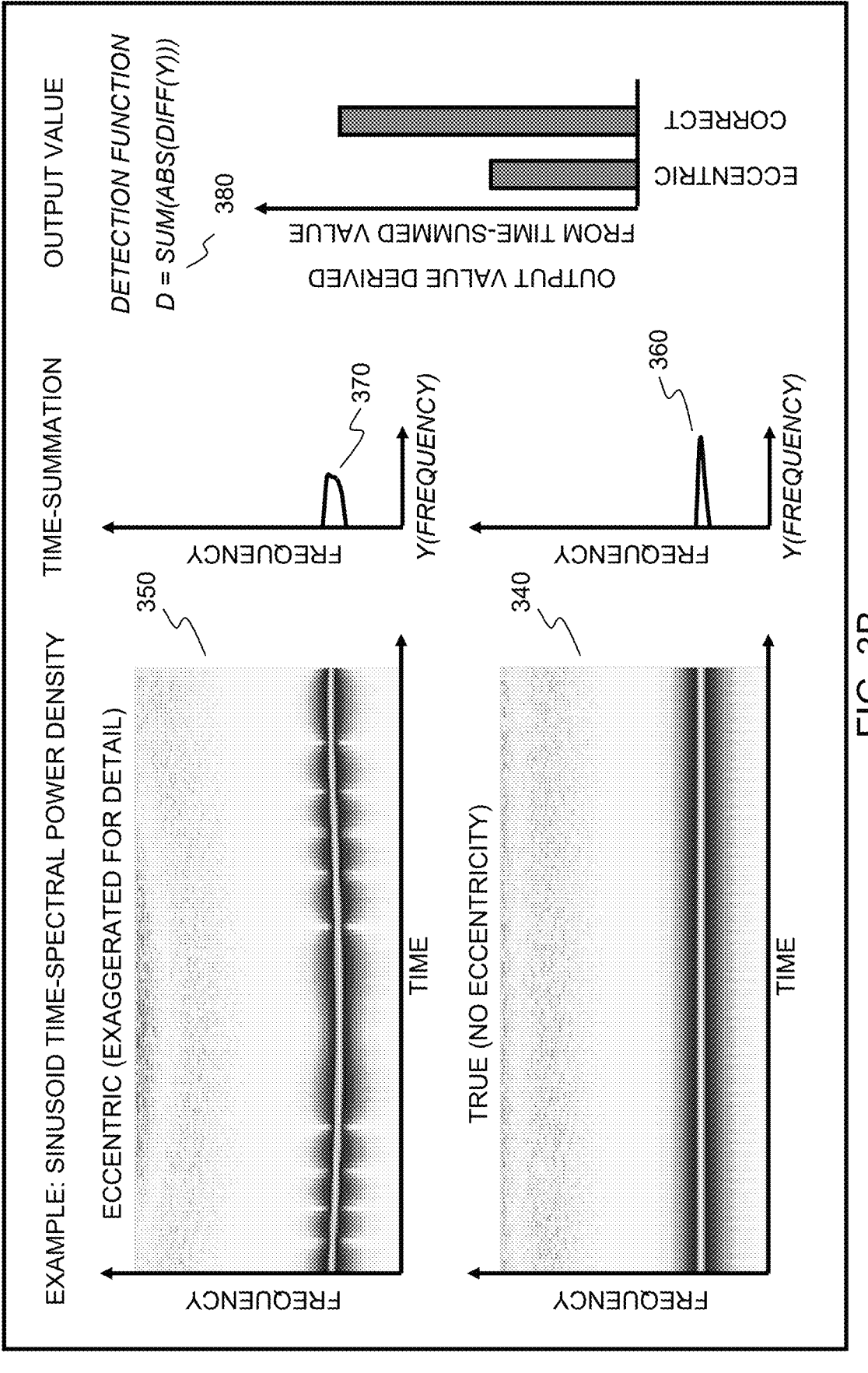
FIG. 3B is a schematic diagram illustrating a power-spectral based detection function concept, according to an example embodiment.

For clarification, a graphical illustration is shown in FIG. 3B. FIG. 3B illustrates the time-spectral power density of an idealized, single-frequency (sinusoid) audio segment of 880 Hz 340, as well as a similar audio segment if it has been affected by eccentricity 350. It will be familiar to those skilled in the art that a signal of constant frequency appears as a horizontal band in the time-spectral image (340), and pitch deviations, if significant enough, may be visually discerned (350). In the example of FIG. 3B 350, the 880 Hz sinusoid audio has been affected by 10 mm phonograph playback eccentricity, causing pitch deviation to appear. In the example of FIG. 3B 340, with "correct" audio (no eccentricity) the 880 Hz time-spectrum remains straight. Accordingly, the plots are shown of the $Y(F_m)$ without eccentricity 360 and the $Y(F_m)$ with eccentricity 370. The time-summed plots are shown in a vertical orientation so they can visually match with the vertical frequency axes of the time-spectral images. A discernible difference in the "sharpness" is noted in the intermediate graphs of the two examples: the "correct" audio results in $Y(F_m)$ 360 having greater rising and falling edges than that of the eccentric $Y(F_m)$ 370 due to the coherence of the spectral content.

Note, the overall audio energy is conserved through the summation, however, the illustration is not necessarily shown to scale.

Through illustration of the basic example of sinusoidal audio (FIG. 3B), it may be understood that such evaluation of the time-spectral "sharpness" is responsive to the stimulus of a specific eccentricity correction even in heterogeneous audio data. In addition, it is noted that some variations of these processing steps and formulas might be devised that are essentially the same process, namely, that the "sharpness" of the spectral pattern is evaluated.

Detecting Very Small Eccentricity

Figure 8:
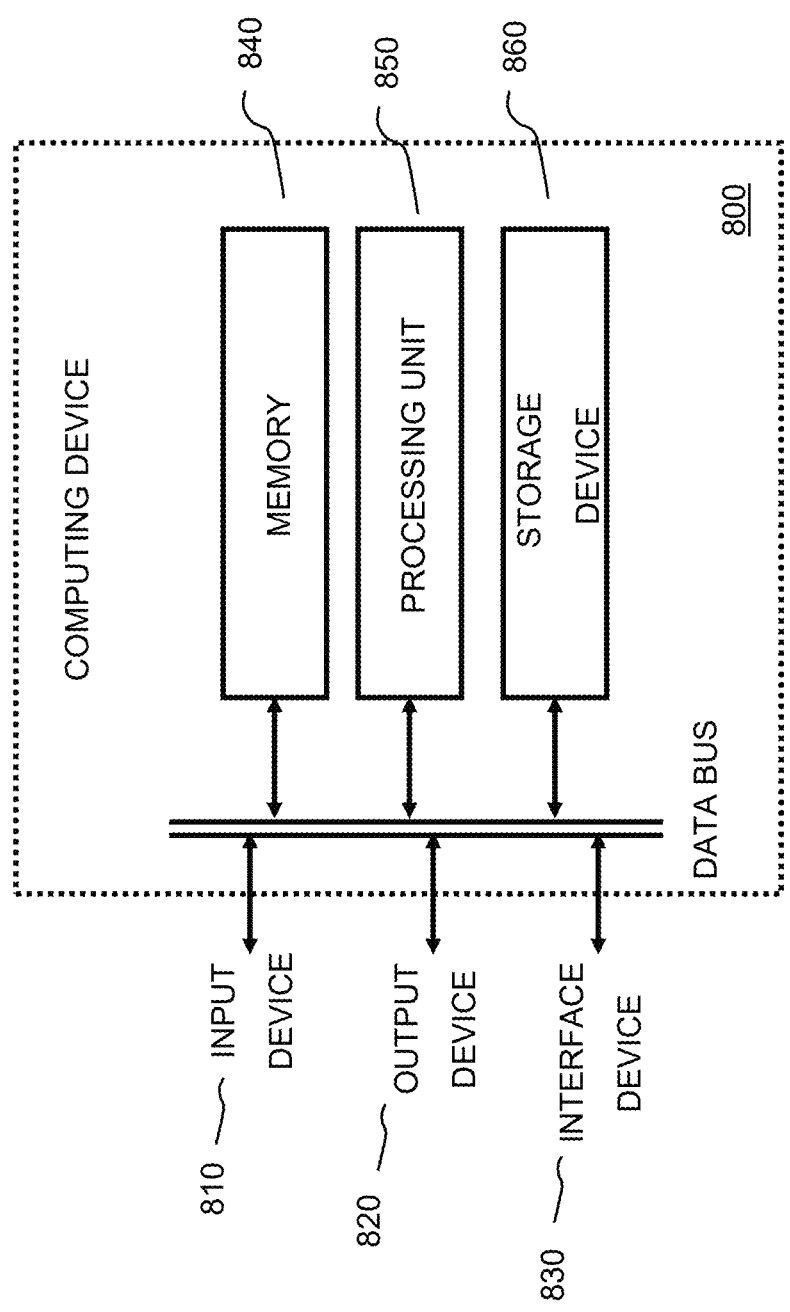
FIG. 8 is a block diagrams illustrating a computing device, according to an example embodiment.

Importantly, the drawings of FIG. 3B and FIG. 8 show greatly exaggerated eccentricity for illustrative purposes, and this does not limit the disclosed technology to large or visually evident eccentricity. The illustrations include offset distances of 10 mm (simulated), FIG. 3B, and approximately 16 mm (real world example), FIG. 8. Typical affected audio recordings exhibit smaller detectable variations, in the range of approximately 0.01 mm (or smaller) to 5 mm (or possibly greater). The disclosed methods can detect very small eccentricity, potentially including any audibly discernible eccentricity. In the lower and most typical range of detectable offsets, such pitch variations cannot be discerned visually at all in a time-spectral display. Even in the upper range of typical offsets, pitch variations are often difficult or impossible to discern visually due to the heterogeneity of audio data, and often they may only be visually appreciated, if at all, by comparing the time-spectral displays before and after correction.

Comparison with Prior Methods

It is underscored that the present disclosed technology is not, to use common terminology, an audio "pitch tracking" method. As previously described, audio "pitch tracking" methods decompose or otherwise analyze the time-spectral contents in order to estimate the absolute or relative pitch, for example by identifying the highest-energy components or by fitting shapes or polynomials to the peaks or via other methods, and they create a time series of estimates of the pitch characteristics of the audio content. Such methods may be confounded by the natural variability of audio content. For example, the musical "bend" of a guitar string imparts particular temporal pitch changes. A "pitch tracking" scheme for phonograph eccentricity would have to differentiate between musical and non-musical, eccentricity-related pitch changes. In contrast to "pitch tracking", the present disclosed technology may be considered a "model-based detection": it uses a detection function that is receptive of the "sharpness" of the time-spectral content; such sharpness (whatever exists) may be improved only by the correct choice of eccentricity parameters, mostly irrespective of the heterogeneous audio content. Although some confounding cases may exist, such as audio that incorporates other eccentrically played sound sources, turntable motor drive-related wow, or audio with no spectrally coherent contents at all, such pathological cases do not negate the general utility of the disclosed technology. The methods disclosed, namely the phonograph simulation-based pitch modification and correction, the time-spectral detection function processing, and a scheme for parameter search in a viable parameter space, enable the estimation of vanishingly small pitch variations associated with eccentric phonograph playback from heterogeneous audio data, even audio (as with music) containing other small or large pitch variations of their own.

Parameter Estimation Process

Figure 2B:
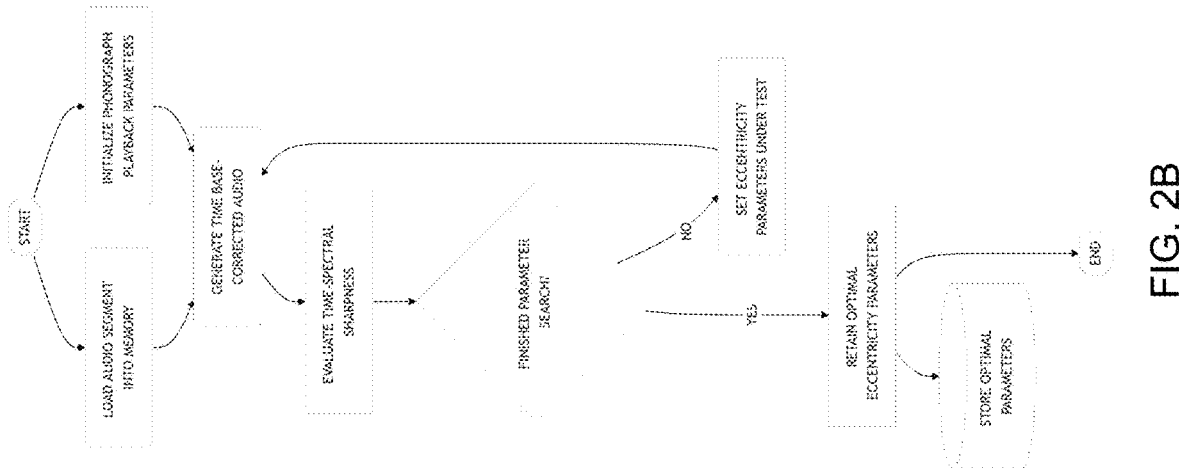
FIG. 2B is a flow diagram illustrating a process for estimation of parameters of eccentric record playback in a digital audio data segment, according to an example embodiment.
Figure 4A:
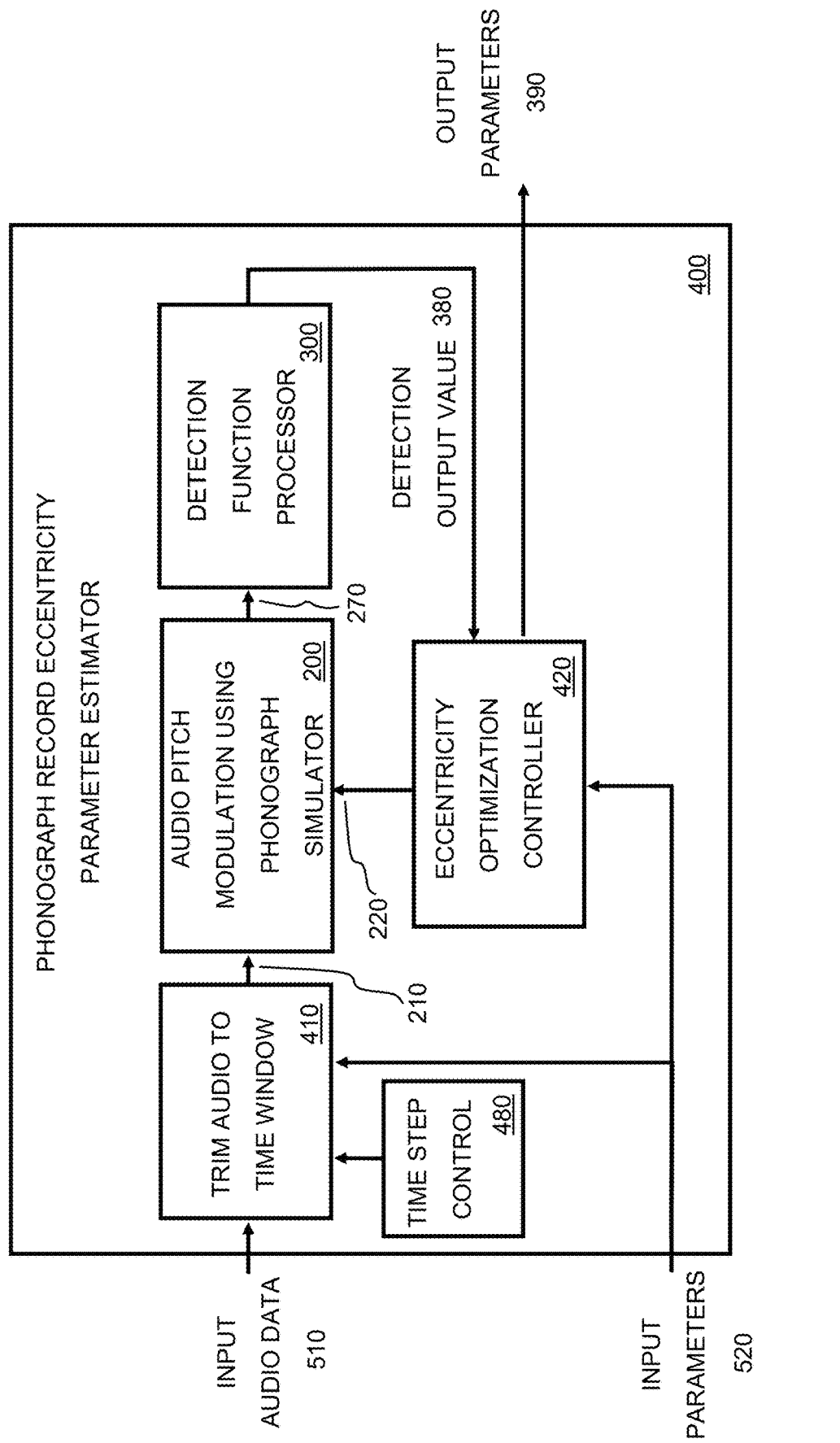
FIGS. 4A and 4B are block diagrams illustrating processing modules for the estimation of parameters of eccentric record playback, according to an example embodiment.
Figure 4B:
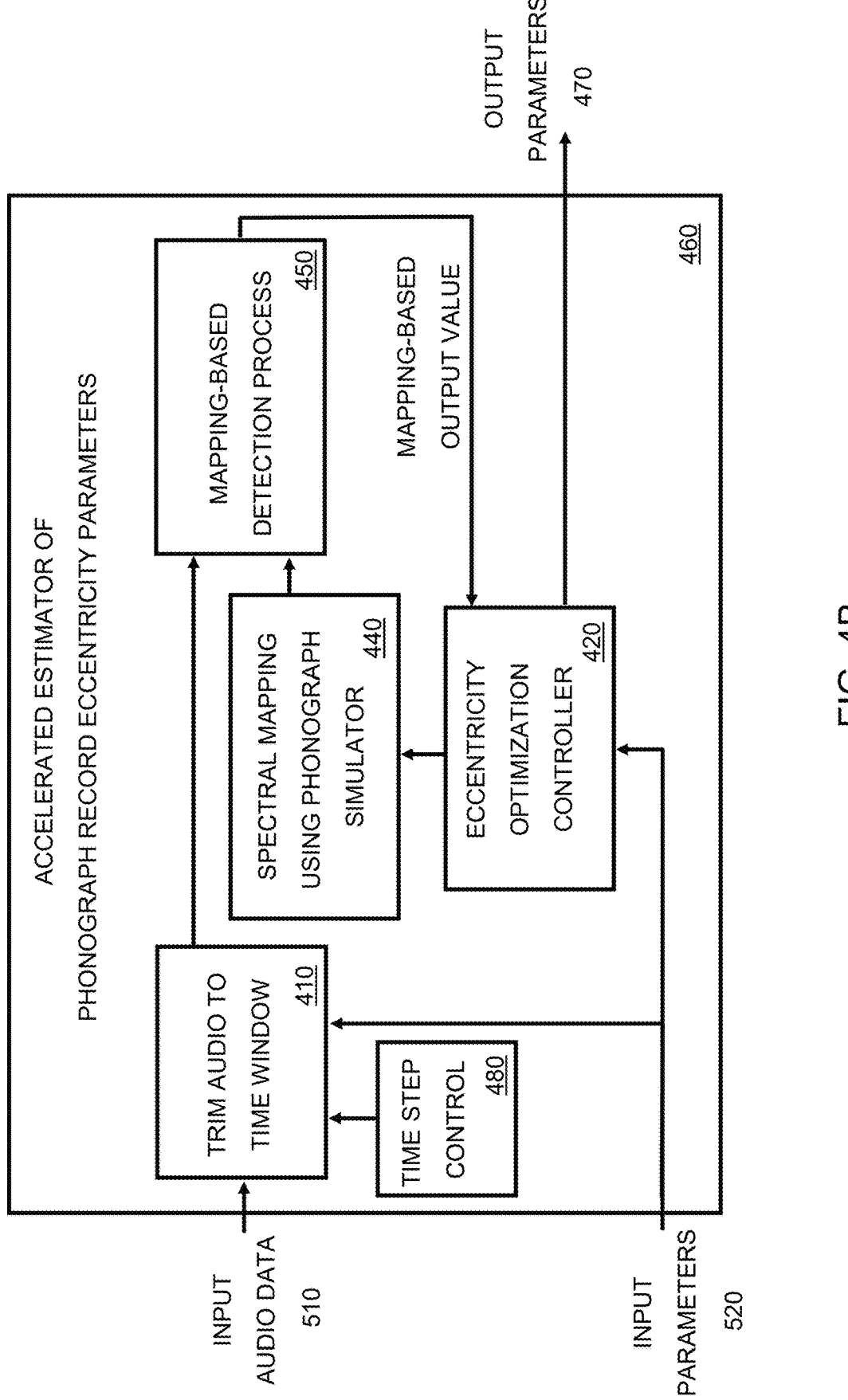

A parameter estimation process is developed as follows. FIG. 2B shows a flow diagram for phonograph eccentricity parameter estimation. Upon the start of the process, a segment of audio data is loaded in memory and playback parameters are initialized. At this point, the eccentricity offset vector "under test" has been set under control of the parameter search scheme: the offset is initialized to a starting value (for global search) or a best initial guess (for iterative search). The phonograph simulator is used to generate a candidate interpolated, pitch-modified audio segment. This candidate audio is evaluated by the time spectral sharpness function processor, and the detection output value is stored. Finally, the process is repeated with other offset parameter values or the process finishes by retaining and storing the optimal offset parameter. Given that recordings may have a wide range of time durations, input audio data are portioned into audio segments (210) of duration and interval suitable to detect the playback eccentricity as shown by FIG. 4A and FIG. 4B, 410. The time window will usually be approximately a small multiple of, or a single, rotation time of the record at its presumed playback speed. The phonograph playback parameters 520 are initialized by some method, for example, from measurements of the actual record, or by choosing among typical record formats. Unlike general audio processing tools, the use of a physical parameterized model allows the range of suitable parameters to be efficiently chosen via considerations of the real-world dimensions. Thus, the size of the parameter search space is considerably reduced. In addition, the ranges for potentially valid parameters can be ascertained using a pre-processing estimation FIG. 4B, 460.

As previously described, the parameters required to model phonograph playback are: phonograph groove radius at the stylus tip; turntable platter rotation (drive) speed; turntable tonearm length; and, turntable tonearm mounting distance. Initial angles may be provided or they may be set to zero; and, if the turntable is of a linear tracking type, then tonearm length and mounting distance are not required. Finally, for short enough audio segments, the tonearm geometry is less important; in such cases, the physical radius can be substituted by a guess or by a reasonable default radius value and a relative offset factor, combined with an absolute offset angle.

Figure 2C:
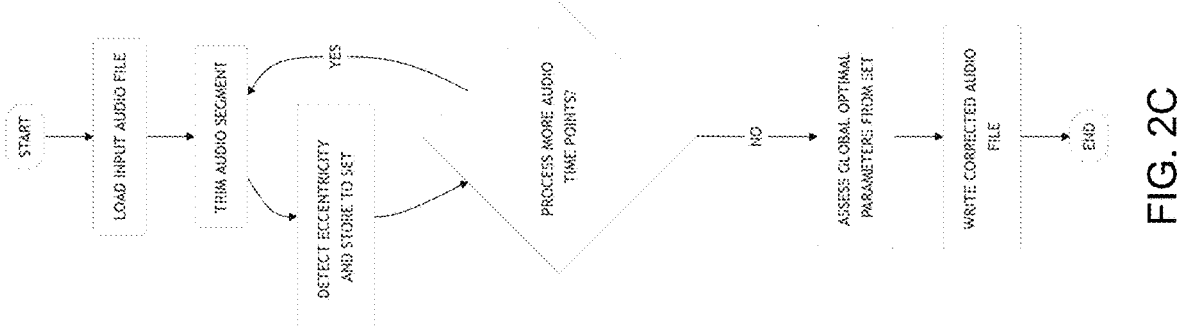
FIG. 2C is a flow diagram illustrating a process for estimation and correction of eccentric record playback for a whole digital audio data file, according to an example embodiment.

A flow diagram for processing a whole digital audio data file, according to an example embodiment, is illustrated in FIG. 2C. According to such embodiment, an audio data file is selected, and data and descriptive information from the file are loaded. Audio data may be loaded into memory in their entirety, or they may be loaded on demand as needed. An audio segment is provided to the eccentricity detection process. The detection produces an optimal eccentricity vector for the audio segment as previously described and outlined in FIG. 2B, in an example embodiment. Additional time points within the audio may be processed as directed by the Time Step Control (FIG. 4A, 4B 480). This may be directed by the user input, or it may be done automatically, as to avoid silent audio regions, for example. When there are no more time points to be processed, the stored individual optimal eccentricity vectors are aggregated into one optimal eccentricity vector, for example by a linear regression over the time-series of optimal offset vectors. The parameters may be refined further at this stage, as by the process of FIG. 5, in an example embodiment. Finally, the whole audio output is produced using the audio pitch modification by interpolation (FIG. 2A), where the input playback parameters 220 include the global optimal offset. Hence, by this exemplary embodiment, an audio file to be corrected is supplied; a phonograph eccentricity detection and correction are performed; and, a corrected output audio data is provided, as by an audio data file.

Details and processes of phonograph eccentricity parameter estimation are disclosed as illustrated in FIG. 4A, 4B. An eccentricity optimization controller 420 sets the parameters, constrained within the parameter search ranges. As shown in FIG. 4A, the phonograph simulator 200 generates modified audio data 270, and the detection function process 300 is evaluated on this audio, yielding a single value per the parameters. The output of the estimation processor 400 is the optimal eccentricity parameter set 390 for the given audio time window. Additionally, as shown in FIG. 4B 460, the parameter search ranges may be roughly estimated by use of an accelerated process. In that process 460, the phonograph simulation is used to generate time-spectral mapping patterns 440, and a limited-resolution mapping-based detection 450 is evaluated on the time-spectral content of the unmodified, original audio data. Its output 470 provides a parameter set as well (compare with 390). Importantly, the accelerated process 460 avoids repeated interpolation and other steps, and therefore it may be faster to compute. Similarly to the first detection function process 300, the mapping-based detection function is such that its extremal output value tends to occur when the test parameters nearly or exactly match the true eccentricity, and other parameters yield detection values well separated from the extremal value.

Detection Control Process

In the detection optimization scheme, the parameter traversal by FIG. 4A, 420 may be exhaustive (global) over the set of potential parameters defined within a search space, or it may be an iterative gradient-based descent (or, ascent) scheme. In the iterative optimization, the output value (380) is used to determine a local gradient of the detection function output with respect to the input eccentricity vector components. In a subsequent iteration, the eccentricity vector is adjusted by a step size in the direction of maximum improvement.

Figure 5:
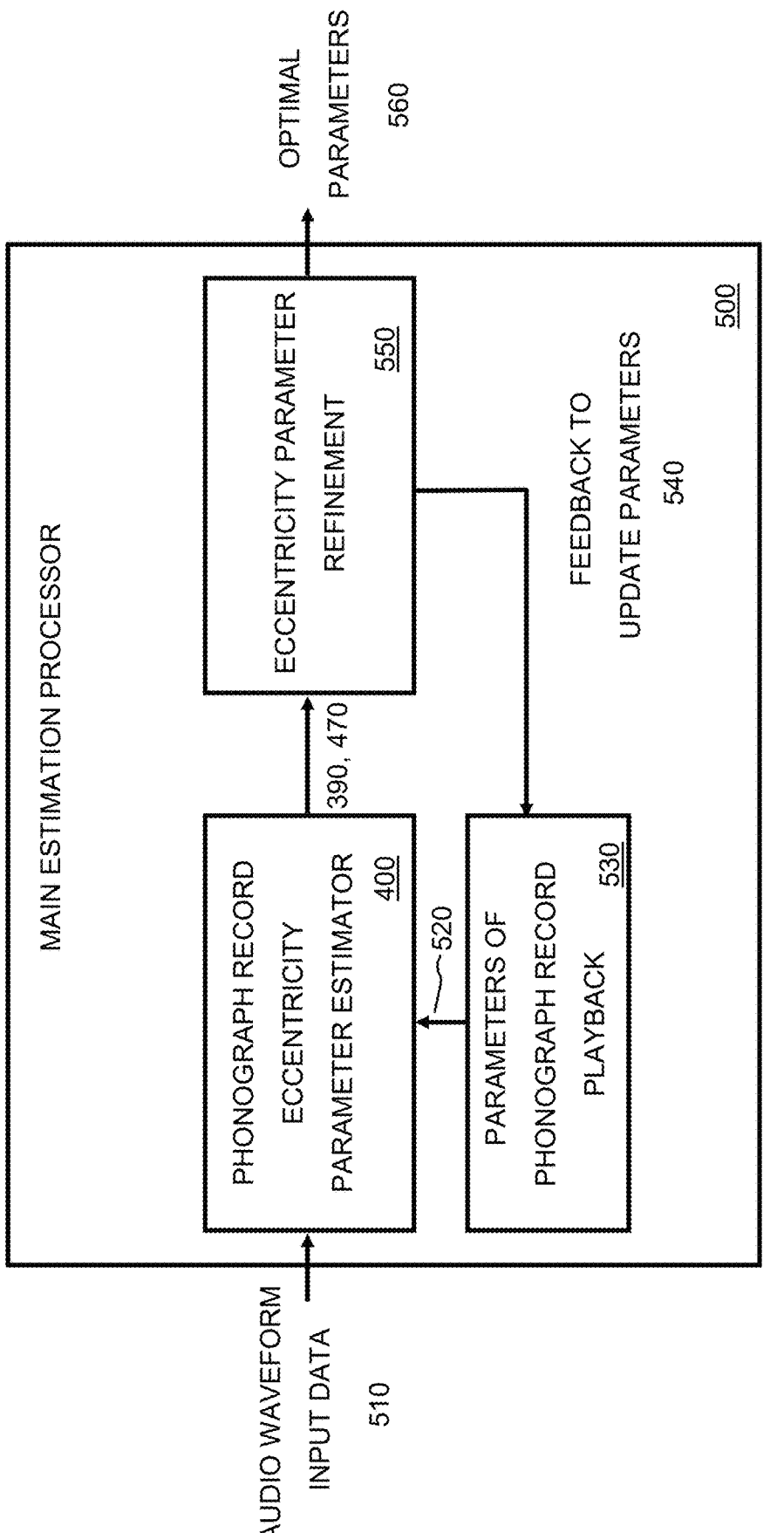
FIG. 5 is a block diagram illustrating a main estimation module for estimation of parameters for multiple time points in whole audio data, according to an example embodiment.

A global process provides the time step control shown in FIG. 4A, 4B and directs the parameter estimation process for the whole audio data as shown in FIG. 5. Each time point of interest, i.e. portion, of the audio yields an estimated output parameter set 390 (or, 470 if using the accelerated estimation). The estimation results may be retained as a time series, and they may be passed to a parameter refinement process 550 that derives one best set of parameters for the whole audio data. Due to the heterogeneous content of audio recordings, some of the parameters will be outliers, and the refinement process may thus be used to suppress and remove outliers, which can be done by manual as well as automatic methods. For example, in an example embodiment the refinement is achieved by linear regression fitting for the collected optimal parameters over the audio time course. Additionally, the parameters of eccentric record playback are interdependent. In some cases, the interdependence can be eliminated by specifying (fixing) one or more parameters based on prior knowledge. However, in the general case the interdependence may be addressed by applying one or more additional iterations of the process 500 with feedback 540 to update the parameters. For example, the groove radius may decrease significantly over the length of the audio, resulting in a certain track width that may not be known a priori. The track width may be initialized either from measurements or from a preset such as a typical groove spacing. To achieve a uniform correction, the track width may be updated by deriving a new track width value based on the whole audio parameter time series. If the groove spacing is not uniform, its impact could also be potentially estimated and corrected.

Generation of Output Audio

Upon completing the parameter estimation process, the corrected output audio may be generated as shown in FIGS. 6A and 6B. In one embodiment as shown in FIG. 6A 600, the estimated eccentricity parameters are supplied to the phonograph simulator to perform pitch correction. In an additional embodiment (FIG. 6B 620), additional time base variations 610 associated with the playback system drive speed or other effects are incorporated into the correction to further improve the resulting pitch stability and audio quality.

Computer Software Embodiment

Figures 7A, 7B:
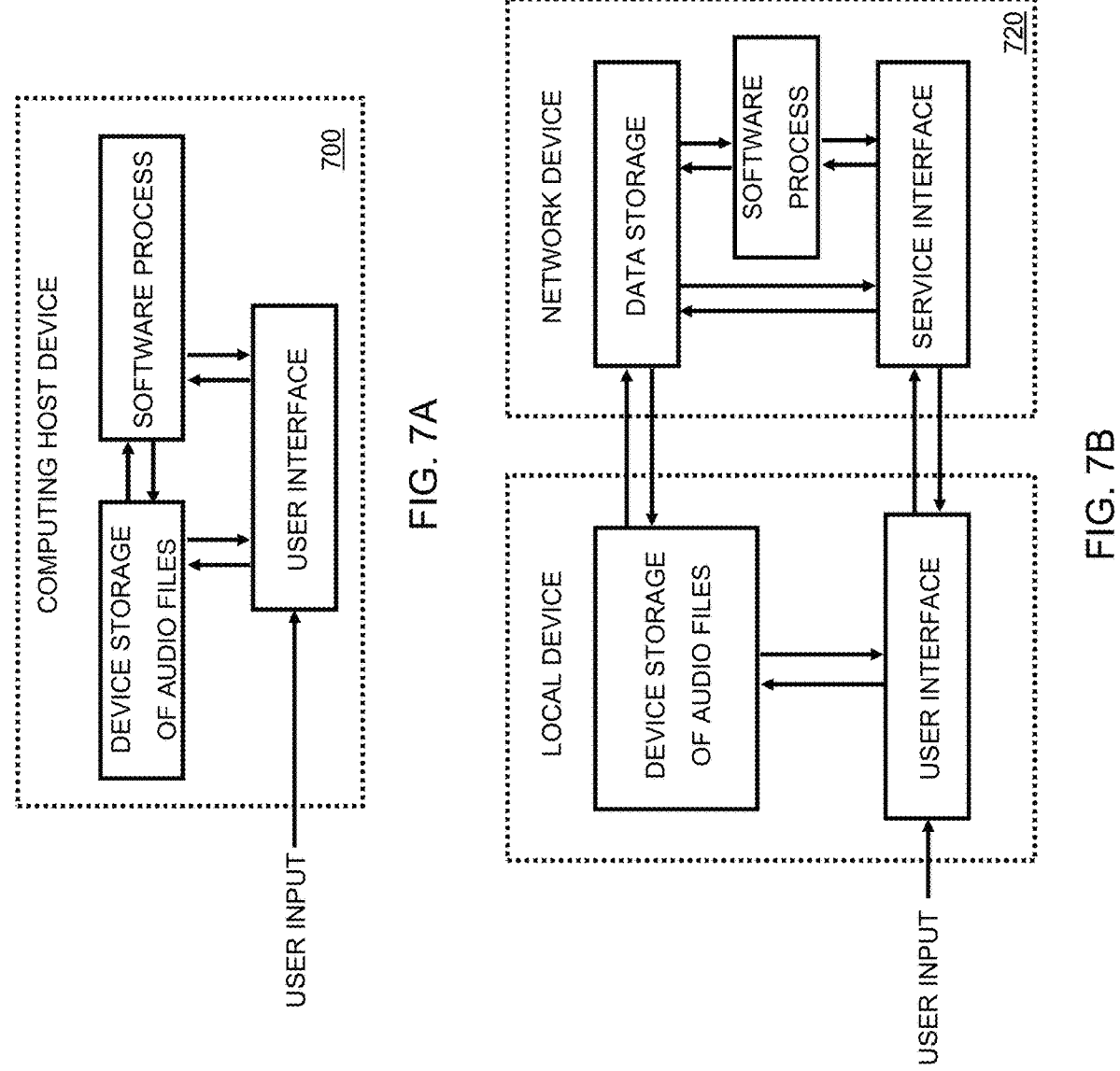
FIGS. 7A and 7B are block diagrams illustrating application modules in a computing host device or over a network connection, according to an example embodiment.

The aforementioned processes may be employed through the use of personal computing devices, as shown in FIG. 7A, and they may be employed online on remote networks, as illustrated in FIG. 7B. In the personal computing device example embodiment of 7A, the user selects a locally stored audio file and receives a processed corrected audio file to the device storage. Alternatively as shown in 7B, the user interacts with a process over a network-based interface or through an Application Programming Interface (API); the user selects a locally stored audio file, and a network resource conducts upload of the data to a server; processing takes place on a network resource or server, such as virtual machine or other local or remote computing instance, and the network service interface facilitates download of a corrected audio file or playback of a corrected audio stream to the user over the network connection.

An example computing device 800 architecture that can be utilized in example embodiments is illustrated in FIG. 8. Audio data can be imported into an internal storage device 860 by an input device 810. An input device may include readers of a physical digital storage medium such as compact discs and others, analog-to-digital (AD) converter or audio capture card ("sound card") that enables the acquisition of an analog source or digital audio stream by the host device. Comparably, an output device 820 provides export of digital audio data to a physical storage medium or to a digital-to-analog (DA) converter for sound reproduction, as by a digital audio sound card. Digital audio data files or streams may be imported, exported, uploaded, or downloaded by an interface device 830 such as a digital audio sound card over Universal Serial Bus (USB) audio interface, USB flash memory device ("memory stick"), a wireless network interface, Bluetooth audio connection, Ethernet network connection, or others. In the computing device 800, a random access memory 840 holds operating system and software process instructions as machine code in a portion of sequential memory and further provides temporary storage for functional objects and data in dynamically allocated memory blocks. Such constitutes an exemplary embodiment for the memory storage for the methods, and other configurations may exist. A processing unit 850 executes instructions and conducts operations on data. The processing unit can be implemented as a single multi-core CPU, as multiple CPUs, as a distributed computing system (e.g., cloud-based virtual machines), as well as local or cloud-based Graphics Processing Units (GPUs). A storage device 860 provides non-volatile storage for audio data files and other associated data as part of software processing functions. The storage device 860 may be disk drive, tape drive, solid state drive, among others.

Figure 9:
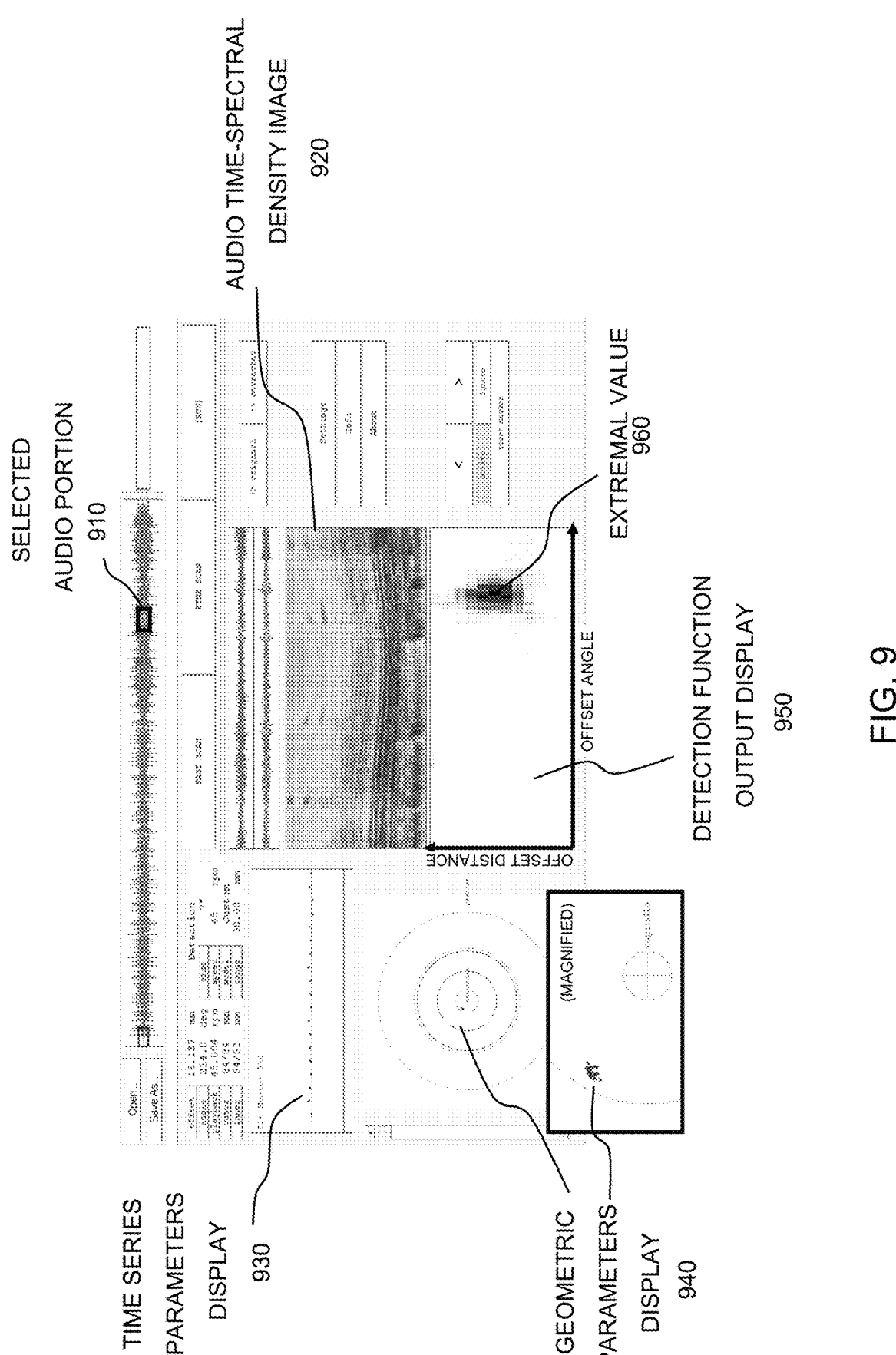
FIG. 9 is a schematic diagram illustrating a computer software user interface, according to an example embodiment.

An example computer software user interface for the disclosed technology is shown in FIG. 9. The graphic portrays an interactive tool with various controls including automatic and manual intervention utilities. After loading a file containing audio data, the audio data is displayed and automatically portioned into time windows of appropriate duration and interval, and the user may select one portion as shown FIG. 9, 910. Time-spectral data of the audio segment may be displayed as an image 920 so that the user may inspect the audio contents. This can aid in selecting portions of audio, such as quiet regions, to be ignored by processing. The user may run processing for all time points, or they may individually process a time window. Each time window may have an associated parameter estimation detection function visualization 950 that displays the aggregated results over the parameter search space, i.e., the detection outputs D(distance, angle) 950, if an exhaustive (global) search scheme is used. The visualization will tend to reveal a prominent outlying or extremal value 960, as previously described, only at the correct point in the parameter space, i.e. the optimal point of the detection function, and hence it indicates the true eccentricity parameters. An automatic process may find the peak of the D(distance, angle) mapping. Repeating this detection process over all of the time points leads to the parameter time series, as previously described, which may be displayed for the user as a time trend 930 and which may also be visualized as points in the spatial depiction 940 of the turntable. (As shown, the depiction may include components such as the turntable spindle (a circle with crosshairs), a large centering hole radius typical of 7" records, a record groove inner and outer radii, platter outer edge, and other parts.) For each time window, the user may select and drag a marker within the detection window, thereby manually adjusting the parameters. The parameter refinement process, as described, may yield a single parameter set for the user. Finally, when the user is satisfied with the estimation, they may generate the interpolated pitch-corrected output audio data.

Spirit and Scope of the Invention

The complete process and methods that achieve these estimation and correction functions include many additional details, customizations and enhancements. As well, diagrams and illustrations may omit some parts and connections by necessity. It should be understood that the present disclosure sufficiently states essential aspects and components, such that it could be implemented by one skilled in the art, apart from additional important and necessary components (for example, interpolation and time-spectral analysis, and computing systems) it may contain or make use of. The implementation of the disclosed technology is primarily realized by a computer software program, however, a combination of software and hardware devices may be used. Some drawings are employed to convey concepts and are not intended to restrict the scope or applicability to only those examples portrayed. In particular, drawings show exaggerated or arbitrarily scaled levels of audio pitch variation, and it is underscored that the disclosed technology provides for estimation of extremely small variations that may be too small to be detected by such methods. Finally, it will be recognized by those skilled in the art that numerous technical variations of the foregoing concepts could be devised such as alternative mathematical expressions, data scaling, storage and display formats, optimization approaches, and simplifications or approximations, some of which have been mentioned in the present disclosure. Such alterations might change the formulas, terms, or some processing choices in the methods while essentially matching the present disclosed technology, and as such would fall within the spirit and scope of the disclosure.

SUMMARY

In summary, methods and processes of computer-readable instructions evaluated in computing hardware are disclosed for estimating and correcting the pitch variations associated with eccentric phonograph record playback in digital audio. Unlike general audio processing approaches, the disclosed technology specifically models the physical record eccentricity and phonograph playback system; it uses this approach to generate portions of audio "under test" with a certain parameter search space; it evaluates a mathematical detection function on the time-spectral representation of the audio "under test"; and it conducts a parameter optimization by identifying the extremal value of the detection function, and thereby finding the parameters that best match the eccentricity for the given audio. And, the disclosed technology may iteratively inform the parameter estimation over an entire input audio data by processing multiple smaller time windows with multiple stages of parameter refinement. These concepts comprise an exceptionally sensitive and specific estimation for phonograph eccentricity. The disclosed technology further enables additional corrections for drive speed or other time base fluctuations. The disclosed technology enables estimation of physical parameters of record playback using only the recorded digital audio, enabling corrections to be conducted, e.g., by receiving the data over the internet, with or without additional information from record and playback system measurements.

CONCLUSION

Phonograph records continue to be a valuable medium of sound reproduction and archival. The present disclosure presents a novel and potentially practical solution to help reproduce audio recordings from phonographs as they were designed to be heard, solving an unusual and challenging audio restoration problem.

What is claimed is:

1. A computer-implemented method comprising:
   receiving a first portion of a digital audio file storing recorded audio data from a turntable playing a phonograph, wherein the recorded audio data includes audio pitch variations caused by eccentric rotation of the phonograph with respect to the turntable during the playing of the phonograph on the turntable;
   generating a first modulated output from the first portion of the digital audio file, wherein generating the first modulated output includes modulating the recorded audio data based on at least one candidate eccentricity vector comprising a candidate eccentricity offset distance and a candidate eccentricity angle, and wherein a time base for the modulating is derived from a simulation of a phonograph playback;
   summing time-spectral data from an audio power timespectral density of the generated first modulated output to obtain time-summed intermediate spectral density data over a plurality of time points for each of a plurality of audio frequency points;
   applying a detection function to the time-summed intermediate spectral density data for a plurality of candidate eccentricity vectors to generate a corresponding plurality of detection output values;

identifying, as an optimal output value, an extremal output value from the plurality of detection output values, wherein the identified extremal output value corresponds to the at least one candidate eccentricity vector approaching an actual eccentricity vector characterizing the eccentric rotation of the phonograph record with respect to the turntable; and
storing, as an optimal eccentricity vector, the candidate eccentricity vector corresponding to the optimal extremal output value.

2. The method of claim 1, further comprising generating a corrected first portion of a corrected digital audio file storing a corrected version of the first portion of the digital audio in which the audio pitch variations caused by eccentric rotation of the phonograph record with respect to the turntable are reduced.

3. The method of claim 1, wherein applying the detection function includes conducting an optimization by searching over a predefined set of candidate eccentricity vectors.

4. The method of claim 1, wherein conducting the optimization includes iteratively updating the candidate eccentricity vectors in a direction of improvement based on a locally determined gradient of the detection output values.

5. The method of claim 1, further comprising:
   performing the method for a plurality of portions of the digital audio file to identify a corresponding plurality of optimal eccentricity vectors associated with the plurality of portions; and
   deriving, via regression, a combined optimal eccentricity vector for an aggregation of the plurality of portions of the digital audio file; and
   generating a corrected entire digital audio file storing a corrected version of the entirety of the digital audio in which the audio pitch variations caused by eccentric rotation of the phonograph record with respect to the turntable are reduced.

6. The method of claim 1, further comprising compensating rotation speed fluctuations based on a plurality of optimal eccentricity vectors that includes the stored optimal eccentricity vector.

7. A system comprising:
   a processor configured to perform tasks including:
   receiving a first portion of a digital audio file storing recorded audio data from a turntable playing a phonograph, wherein the recorded audio data includes audio pitch variations caused by eccentric rotation of the phonograph with respect to the turntable during the playing of the phonograph on the turntable;
   generating a first modulated output from the first portion of the digital audio file, wherein generating the first modulated output includes modulating the recorded audio data based on at least one candidate eccentricity vector comprising a candidate eccentricity offset distance and a candidate eccentricity angle, and wherein a time base for the modulating is derived from a simulation of a phonograph playback;
   summing time-spectral data from an audio power timespectral density of the generated first modulated output to obtain time-summed intermediate spectral density data over a plurality of time points for each of a plurality of audio frequency points;
   applying a detection function to the time-summed intermediate spectral density data for a plurality of candidate eccentricity vectors to generate a corresponding plurality of detection output values;
   identifying, as an optimal output value, an extremal output value from the plurality of detection output values, wherein the identified extremal output value corresponds to the at least one candidate eccentricity vector approaching an actual eccentricity vector characterizing the eccentric rotation of the phonograph record with respect to the turntable; and storing, as an optimal eccentricity vector, the candidate eccentricity vector corresponding to the optimal extremal output value.

8. The system of claim 7, wherein the tasks further comprise generating a corrected first portion of a corrected digital audio file storing a corrected version of the first portion of the digital audio in which the audio pitch variations caused by eccentric rotation of the phonograph record with respect to the turntable are reduced.

9. The system of claim 7, wherein applying the detection function includes conducting an optimization by searching over a predefined set of candidate eccentricity vectors.

10. The system of claim 7, wherein conducting the optimization includes iteratively updating the candidate eccentricity vectors in a direction of improvement based on a locally determined gradient of the detection output values.

11. The system of claim 7, further comprising:

performing the method for a plurality of portions of the digital audio file to identify a corresponding plurality of optimal eccentricity vectors associated with the plurality of portions; and deriving, via regression, a combined optimal eccentricity vector for an aggregation of the plurality of portions of the digital audio file; and generating a corrected entire digital audio file storing a corrected version of the entirety of the digital audio in which the audio pitch variations caused by eccentric rotation of the phonograph record with respect to the turntable are reduced.

12. The system of claim 7, further comprising compensating rotation speed fluctuations based on a plurality of optimal eccentricity vectors that includes the stored optimal eccentricity vector.

13. An article of manufacture including a non-transitory computer-readable medium, having stored thereon program instructions that, upon execution by a processor, cause the processor to perform tasks including:

receiving a first portion of a digital audio file storing recorded audio data from a turntable playing a phonograph, wherein the recorded audio data includes audio pitch variations caused by eccentric rotation of the phonograph with respect to the turntable during the playing of the phonograph on the turntable;

generating a first modulated output from the first portion of the digital audio file, wherein generating the first modulated output includes modulating the recorded audio data based on at least one candidate eccentricity vector comprising a candidate eccentricity offset distance and a candidate eccentricity angle, and wherein a time base for the modulating is derived from a simulation of a phonograph playback;

summing time-spectral data from an audio power time-spectral density of the generated first modulated output to obtain time-summed intermediate spectral density data over a plurality of time points for each of a plurality of audio frequency points;

applying a detection function to the time-summed intermediate spectral density data for a plurality of candidate eccentricity vectors to generate a corresponding plurality of detection output values;

identifying, as an optimal output value, an extremal output value from the plurality of detection output values, wherein the identified extremal output value corresponds to the at least one candidate eccentricity vector approaching an actual eccentricity vector characterizing the eccentric rotation of the phonograph record with respect to the turntable; and storing, on a memory device, as an optimal eccentricity vector, the candidate eccentricity vector corresponding to the optimal extremal output value.

14. The article of manufacture of claim 13 wherein the tasks further comprise generating a corrected first portion of a corrected digital audio file storing a corrected version of the first portion of the digital audio in which the audio pitch variations caused by eccentric rotation of the phonograph record with respect to the turntable are reduced.

15. The article of manufacture of claim 13, wherein applying the detection function includes conducting an optimization by searching over a predefined set of candidate eccentricity vectors.

16. The article of manufacture of claim 13, wherein conducting the optimization includes iteratively updating the candidate eccentricity vectors in a direction of improvement based on a locally determined gradient of the detection output values.

17. The method of claim 13, further comprising:

performing the method for a plurality of portions of the digital audio file to identify a corresponding plurality of optimal eccentricity vectors associated with the plurality of portions; and deriving, via regression, a combined optimal eccentricity vector for an aggregation of the plurality of portions of the digital audio file; and generating a corrected entire digital audio file storing a corrected version of the entirety of the digital audio in which the audio pitch variations caused by eccentric rotation of the phonograph record with respect to the turntable are reduced.

18. The article of manufacture of claim 13, further comprising compensating rotation speed fluctuations based on a plurality of optimal eccentricity vectors that includes the stored optimal eccentricity vector.

\* \* \* \* \*